(12) United States Patent
Park et al.

(10) Patent No.: US 9,651,956 B2
(45) Date of Patent: May 16, 2017

(54) APPARATUS AND METHOD FOR SUPPLYING POWER IN MOBILE TERMINAL

(71) Applicant: Samsung Electronics Co. Ltd., Suwon-si, Gyeonggi-do (KR)

(72) Inventors: Chulwoo Park, Suwon-si (KR); Kwangsub Lee, Yongin-si (KR); Chuleun Yun, Hwaseong-si (KR); Seyoung Jang, Seongnam-si (KR); Kuchul Jung, Seoul (KR); Yunhui Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 13/933,454

(22) Filed: Jul. 2, 2013

(65) Prior Publication Data

US 2014/0015507 A1    Jan. 16, 2014

(30) Foreign Application Priority Data

Jul. 11, 2012    (KR) .................. 10-2012-0075459

(51) Int. Cl.
*G05F 1/46*    (2006.01)
*H04B 1/16*    (2006.01)

(52) U.S. Cl.
CPC ............. *G05F 1/46* (2013.01); *H04B 1/1607* (2013.01)

(58) Field of Classification Search
CPC ................... G05F 1/46; H04B 1/1607

USPC .............................................. 307/82; 323/304
See application file for complete search history.

(56) References Cited

U.S. PATENT DOCUMENTS

| | | | |
|---|---|---|---|
| 2008/0084112 A1 | 4/2008 | Kumar et al. | |
| 2010/0194344 A1 | 8/2010 | Greyling | |
| 2010/0219687 A1* | 9/2010 | Oh | G05F 1/46 |
| | | | 307/39 |
| 2010/0327833 A1 | 12/2010 | Singnurkar | |
| 2011/0089915 A1 | 4/2011 | Qiu et al. | |

(Continued)

FOREIGN PATENT DOCUMENTS

| | | |
|---|---|---|
| CN | 101946222 A | 1/2011 |
| CN | 102055332 A | 5/2011 |

(Continued)

*Primary Examiner* — Joseph Chang
(74) *Attorney, Agent, or Firm* — Jefferson IP Law, LLP

(57) ABSTRACT

An apparatus for supplying power in a mobile terminal is provided. The apparatus includes a battery, a power management integration circuit including a buck-boost converter for converting a battery voltage to output a specific voltage, and a plurality of regulators for regulating the specific voltage output from the buck-boost converter to voltages of respective corresponding constituent elements and for outputting the regulated voltages, the buck-boost converter operating in a buck mode when the battery voltage is greater than the specific voltage, and the buck-boost converter operating in a boost mode when the battery voltage is less than the specific voltage, such that the constituent elements include a controller for controlling an operation of the mobile terminal, a touch panel for generating an input and for providing the generated input signal to the controller, and a display unit for displaying an operation of the mobile terminal under control of the controller.

20 Claims, 10 Drawing Sheets

(56) References Cited

U.S. PATENT DOCUMENTS

| | | | |
|---|---|---|---|
| 2011/0195749 A1* | 8/2011 | Lan | H04W 8/183 455/558 |
| 2012/0176098 A1 | 7/2012 | Greening et al. | |
| 2012/0272086 A1* | 10/2012 | Anderson | G06F 1/206 713/340 |
| 2013/0128637 A1 | 5/2013 | Humphrey et al. | |

FOREIGN PATENT DOCUMENTS

| | | |
|---|---|---|
| JP | 2008-157837 A | 7/2008 |
| KR | 10-2009-0114574 A | 11/2009 |
| KR | 10-2010-0023050 A | 3/2010 |
| WO | 2012/036668 A1 | 3/2012 |
| WO | 2012/038579 A1 | 3/2012 |

* cited by examiner

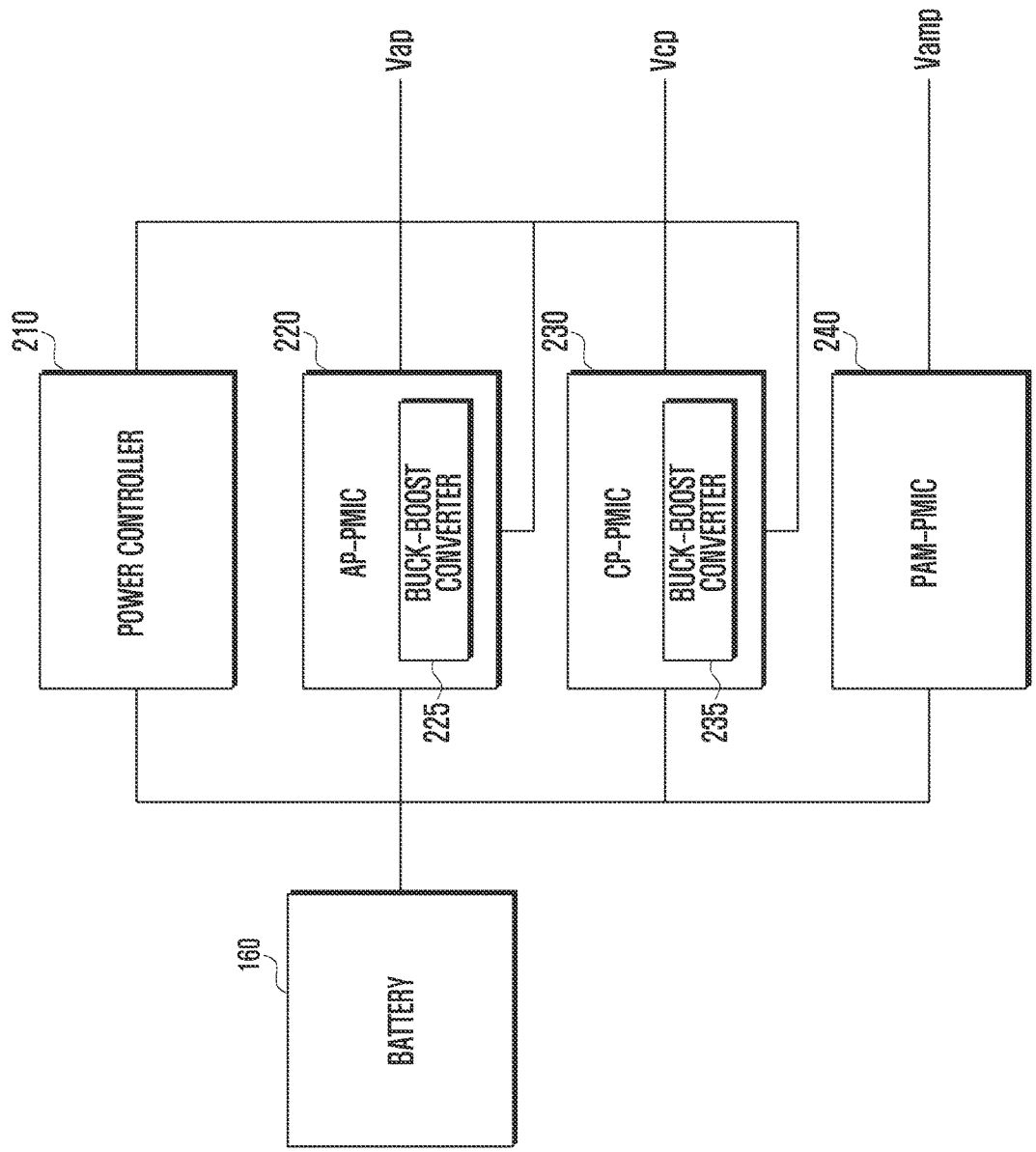

APPARATUS AND METHOD FOR SUPPLYING POWER IN MOBILE TERMINAL

PRIORITY

This application claims the benefit under 35 U.S.C. §119(a) of a Korean patent application filed on Jul. 11, 2012 in the Korean Intellectual Property Office and assigned Serial No. 10-2012-0075459, the entire disclosure of which is hereby incorporated by reference.

BACKGROUND OF THE INVENTION

1. Field of the Invention

The present invention relates to an apparatus and a method for supplying power in a mobile terminal. More particularly, the present invention relates to an apparatus and a method for controlling power supply according to a residual amount of a battery voltage.

2. Description of the Related Art

A mobile terminal operates using a battery. When the battery is completely charged, the battery has a voltage of 4.2V or 4.35V. The voltage of a battery is slowly reduced by the operation of the mobile terminal. If the voltage of the battery is reduced to a specific voltage, an operation of the mobile terminal is turned-off. The voltage threshold for turning-off the operation of the portable terminal is referred to as the cutoff voltage.

The length of time that a battery of the portable terminal can be used is determined based on the power and the battery capacity used in the system. Battery capacity refers to the difference in capacity between a maximum charge voltage and a cutoff voltage of a system. Even if the charge of a battery remains constant, the available capacity of the battery may differ according to the cutoff voltage. In general, the cutoff voltage of a feature phone is 3.3V, and the cutoff voltage of a smart phone is in the range of 3.4V to 3.5V. The cutoff voltage is a voltage where a system normally operates, and is always greater than or equal to the highest voltage used in the system. That is, if the highest voltage used in the portable terminal is 3.3V, the cutoff voltage is 3.3V or greater.

The highest voltage, except for display power and for On The Go (OTG) power, from among voltage used in the portable terminal (e.g., smart phone) is 3.3V. Accordingly, the cutoff voltage of most mobile terminals must be 3.3V or greater, and a corresponding cutoff operation of the system is performed at about 3.4V in consideration of voltage drop. In this case, although there may be more electric charge in the battery, certain operations of the system may be turned-off according to the system cutoff voltage.

Therefore, a need exists for an apparatus and a method for controlling the power supply in a mobile terminal according to a residual amount of a battery voltage.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems, and/or disadvantages and to provide at least the advantages described below. Accordingly, an aspect of the present invention is to provide an apparatus for supplying power capable of efficiently using a battery by reducing a cutoff voltage of a system in a portable terminal, and a method thereof.

Another aspect of the present invention is to provide an apparatus for setting a cutoff voltage of a system while ensuring a dead battery voltage in a portable terminal, and operating in a buck and/or boost mode to supply operation power, and a method thereof.

In accordance with an aspect of the present invention, an apparatus for supplying power in a mobile terminal is provided. The apparatus includes a battery, a power management integration circuit including a buck-boost converter for converting a battery voltage to output a specific voltage, and a plurality of regulators for regulating the specific voltage output from the buck-boost converter to voltages of respective corresponding constituent elements and for outputting the regulated voltages, the buck-boost converter operating in a buck mode when the battery voltage is greater than the specific voltage, and the buck-boost converter operating in a boost mode when the battery voltage is less than the specific voltage, wherein the constituent elements include a controller for controlling an operation of the mobile terminal, a touch panel for generating an input and for providing the generated input signal to the controller, and a display unit for displaying an operation of the mobile terminal under control of the controller, and to which a voltage from the power management integration circuit is supplied.

In accordance with another aspect of the present invention, an apparatus for supplying power in a mobile terminal is provided. The apparatus includes a battery, a power management integration circuit including a plurality of buck-boost converters for converting a battery voltage into specific voltages having different values and for outputting the converted specific voltages to respective corresponding constituent elements, the buck-boost converters operating in a buck mode when the battery voltage is greater than the specific voltages, and the buck-boost converters operating in a boost mode when the battery voltage is less than the specific voltages, and constituent elements including a controller for controlling an operation of the mobile terminal, a touch panel for generating an input and providing the generated input signal to the controller, and a display unit for displaying an operation of the mobile terminal under control of the controller, and to which a voltage from the power management integration circuit is supplied.

In accordance with another aspect of the present invention, an apparatus for supplying power in a mobile terminal is provided. The apparatus includes a controller having a communication processor and an application processor, a touch panel for generating and providing an input signal to the controller, and a display unit for displaying an operation of the mobile terminal under control of the controller, a battery, and a power management integration circuit including a power management integration circuit of the communication processor and a power management integration circuit of the application processor for supplying a voltage to the constituent elements, the power management integration circuit of the application processor including a buck-boost converter for converting a battery voltage and for outputting a specific voltage, and a plurality of regulators for regulating the specific voltage output from the buck-boost converter to voltages of respective corresponding constituent elements and for outputting the regulated voltages, the buck-boost converter operating in a buck mode when the battery voltage is greater than the specific voltage, and the buck-boost converter operating in a boost mode when the battery voltage is less than the specific voltage.

In accordance with another aspect of the present invention, a method of supplying power in a portable terminal including a battery is provided. The method includes inspecting a battery voltage, operating the mobile terminal in a buck mode when the battery voltage is greater than an output voltage of a buck-boost converter to output a preset voltage, and operating the mobile terminal in a boost mode to output a preset voltage when the battery voltage is less than the output voltage of a buck-boost converter, and regulating the output preset voltage to an operation voltage of a corresponding constituent element to supply operation power.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a block diagram illustrating a configuration of a Power Management Integration Circuit (PMIC) shown in FIG. 1 according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
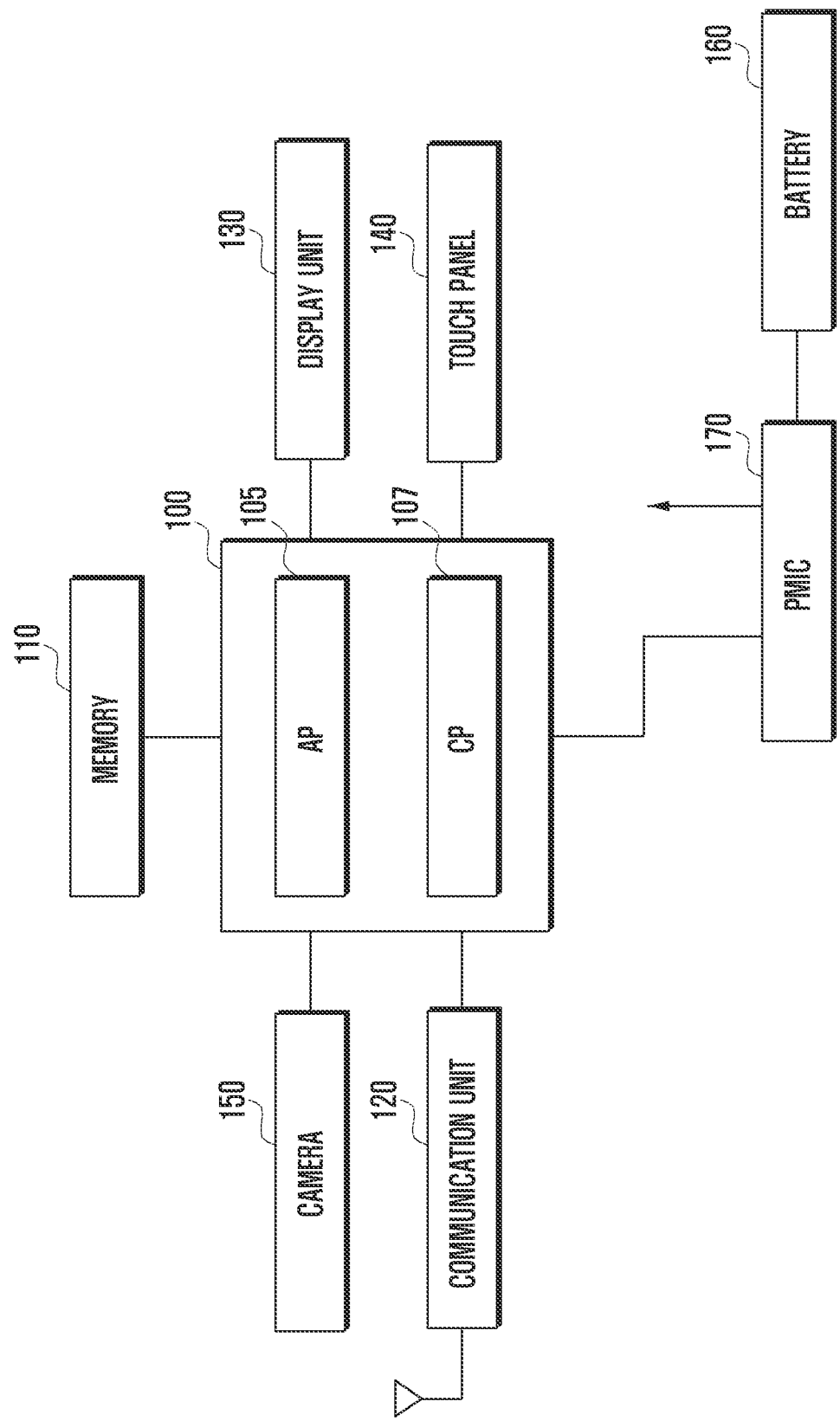
FIG. 1 is a block diagram illustrating a configuration of a mobile terminal according to an exemplary embodiment of the present invention.

The following description with reference to the accompanying drawings is provided to assist in a comprehensive understanding of exemplary embodiments of the inventions defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

In the mobile terminal according to an exemplary embodiment of the present invention, a buck-boost (DC/DC) converter is mounted in a Power Management Integration Circuit (PMIC), and powers of a relatively higher voltage from among powers used in the mobile terminal are separately collected and supplied. When the battery voltage is equal to or greater than a specific voltage, the buck-boost converter of the PMIC operates in a buck mode to generate operation power. When the battery voltage is less than the specific voltage, the buck-boost converter operates in a boost mode to generate operation power. Accordingly, although the battery voltage may be less than an operation voltage, the mobile terminal according to an exemplary embodiment of the present invention may continuously supply the operation power. The specific voltage should be set to the highest operation power from among powers used in the mobile terminal or to a voltage higher than the highest operation power. The specific voltage may be set to the highest voltage from among operation powers used in the mobile terminal, which refers to a maximum operation voltage. Further, in the boost mode, the battery voltage may be less than the maximum operation voltage, and may be a voltage higher than a dead battery voltage.

Further, if a battery of the mobile terminal is completely charged, generally, the battery has a terminal voltage of 4.2V or 4.35V. The battery voltage is slowly reduced by an operation of the mobile terminal. If the charge is reduced to less than a predetermined voltage, discharge is rapidly progressed. Generally, in a discharge curve of a battery, when a graphite based material is used, rapid discharge occurs at a voltage less than 3.4V. When a silicon Si based material is used, a relatively slow discharge is achieved at a voltage less than 3.4V, so that a material of a battery is changed to a Si based material. Accordingly, it is assumed in the exemplary embodiment of the present invention that a Si based battery material is used.

The apparatus for supplying power in a mobile terminal according to an exemplary embodiment of the present invention is equipped with a buck-boost converter and regulators which convert a battery voltage to generate and supply operation powers of respective constituent elements. When the battery voltage is greater than an output voltage of the buck-boost converter, the buck-boost converter operates in a buck mode. When the battery voltage is less than the output voltage of the buck-boost converter, the buck-boost converter operates in a boost mode. The regulators regulate the output voltage of the buck-boost converter to operation powers of corresponding constituent elements. The output voltage of the buck-boost converter may be set to the same voltage as, or set to a voltage higher than, a maximum operation power used in the mobile terminal. The same number of regulators may be provided corresponding to the number of operation powers used in the system.

A controller of the mobile terminal may confirm a buck mode or a boost mode of the apparatus for supplying power using a General Purpose Input/Output (GPIO) Interface. When the mobile terminal is in the boost mode, the controller of the mobile terminal may display that the remaining battery capacity is low, may supply power greater than a specific voltage necessary for the mobile terminal, and may supply power greater than a specific voltage necessary for the whole system.

The apparatus for supplying power in a mobile terminal according to an exemplary embodiment of the present invention may use a plurality of buck-boost converters. In exemplary embodiments, the buck-boost converters are classified by used voltages. When the buck-boost converter operates in a boost mode, a specific function of the mobile terminal may be limited so that power consumption in the battery may be reduced. In exemplary embodiments, in which the buck-boost converters are classified by used voltages in the mobile terminal, a load switch rather than a Low DropOut (LDO) regulator may separate the powers.

FIG. 1 is a block diagram illustrating a configuration of a mobile terminal according to an exemplary embodiment of the present invention.

Referring to FIG. 1, the mobile terminal is a portable terminal and may be any one of various digital devices, such as a portable phone, an MP3 terminal, a tablet, a laptop computer, and the like.

Referring to FIG. 1, a communication unit 120 performs a wireless communication function with a base station or other devices. The communication unit 120 may be a Radio Frequency (RF) communication unit including a transmitter (not shown) up-converting a frequency of a transmitted signal and amplifying the signal, a receiver (not shown) low-noise-amplifying a received signal and down-converting the signal. The transmitter may include a power amplifier amplifying power of the transmitted signal.

A controller 100 controls an overall operation of the mobile terminal, and detects a charge voltage (residual amount of battery) of a battery 160 to control an operation of the mobile terminal.

The controller 100 may include an Application Processor (AP) 105 and a Communication Processor (CP) 107. The CP 107 may include a modem for modulating and demodulating a transmitted signal and a received signal. A modulator modulates a transmitted signal and transfers the modulated signal to a transmitter, and a demodulator demodulates a signal received by a receiver. In exemplary embodiments, the modulation and the demodulation may be Long-Term Evolution (LTE), Wideband Code Division Multiple Access (WCDMA), Global System for Mobile (GSM), WIFI, or Wireless Broadband (WIBRO). In an exemplary embodiment of the present invention, the modem of the CP may include an LTE communication unit and a WIFI communication unit capable of communicating with an LTE base station.

The memory 110 may include a program memory storing an operation program of the mobile terminal and a program according to an exemplary embodiment of the present invention, and a data memory storing data created during execution of the program.

A display unit 130 displays information of an executed application and a state of a battery 160 under control of the controller 100. The display unit 130 may include a Liquid Crystal Display (LCD) or an Organic Light Emitting Diode (OLED). The touch panel 140 may be implemented by a resistive type, a capacitive type, and an electromagnetic induction type. The touch panel 140 detects a touch (finger touch) of a user and/or a pen touch input and outputs the detection result to the controller 100. The display unit 130 and the touch panel 140 may be configured by an integral touch screen. A camera 150 acquires an external image under control of the controller 100.

A PMIC 170 converts a charge voltage of a battery 160 to generate and supply operation powers of respective constituent elements of the mobile terminal.

The PMIC 170 may include an AP-PMIC 220 supplying power of the AP 105 and powers of respective constituent elements controlled by the AP 105, a CP-PMIC 230 supplying power of the CP 107 and powers of respective constituent elements controlled by the CP 107, and a Pulse Amplitude Modulation (PAM) PMIC supplying power of an amplifier for amplifying power of a transmitted signal from the transmitter of the communication unit 120. Further, the AP-PMIC 220 and/or the CP-PMIC 230 may include a buck-boost converter and a plurality of regulators.

The buck-boost converter 225 or 235 detects a voltage of a battery 160. When the detected voltage of the battery 160 is greater than a preset output voltage of the buck-boost converter, the buck-boost converter 225 or 235 operates in a buck mode so that a constant output voltage is always generated. When the detected voltage of the battery 160 is less than the preset output voltage of the buck-boost converter, the buck-boost converter 225 or 235 operates in a boost mode so that a constant output voltage is always generated. In addition, the regulators regulate the output voltage of the buck-boost converter to operation powers of respective constituent elements of the mobile terminal and output the regulated voltage. The output voltage of the buck-boost converter may be set to the same voltage as or a voltage higher than a maximum operation power used in the mobile terminal. The same number of regulators may be provided corresponding to the number of operation powers used in the system.

In an exemplary mobile terminal having a construction as mentioned above, the AP 105 processes various applications of a mobile terminal, and controls operations of a display unit 130, a touch panel 140, and a camera 150 in order to process the applications. The AP-PMIC of the PMIC 170 may supply operation power of the AP 105, and operation powers of the memory 110, the display unit 130, and the touch panel 140 controlled by the AP 105. The CP 107 processes a communication function of the mobile terminal. Moreover, the CP-PMIC 230 of the PMIC 170 may supply operation powers of the CP 107 and constituent elements (e.g., constituent elements except for transmission power amplifiers of a modem and the communication unit 120) controlled by the CP 105.

FIG. 2 is a block diagram illustrating a configuration of a Power Management Integration Circuit (PMIC) shown in FIG. 1 according to an exemplary embodiment of the present invention.

Referring to FIG. 2, a power controller 210 detects a voltage of a battery 160, compares the detected voltage of the battery 160 with a preset voltage to generate a mode control signal. The preset voltage may be an output voltage of the buck-boost converter, a maximum supply voltage or greater output from the PMIC. It is assumed in an exemplary embodiment of the present invention that the preset voltage is an output voltage of the buck-boost converter. In exemplary embodiments, if the detected voltage of the battery 160 is greater than the output voltage of the buck-boost converter, the power controller 210 generates a buck mode control signal. If the detected voltage of the battery 160 is less than the output voltage of the buck-boost converter, the power controller 210 generates a boost mode control signal. If the detected voltage of the battery 160 is equal to the output voltage of the buck-boost converter or a threshold voltage of the output voltage of the buck-boost converter, the power controller 210 generates a buck-boost mode control signal.

The AP-PMIC 220 generates power Vap to be supplied to the AP 105 of the controller 100 and respective constituent elements of the mobile terminal controlled by the AP 105. The AP-PMIC 220 may generate power to be supplied to the AP 105, the memory 110, the display unit 130, the touch panel 140, and the camera 150. The AP-PMIC 220 may include at least one buck converter, at least one buck-boost converter 225, and at least one LDO regulator regulating voltages output from the buck-boost converter to a voltage suitably for constituent elements of the mobile terminal. The AP-PMIC 220 may include a plurality of buck converters, and the buck converts DC/DC converts a voltage of the battery 160 to generate and supply operation powers of constituent elements of the mobile terminal. The AP-PMIC 220 may include a buck-converter 225 and a plurality of LDO regulators. The AP-PMIC 220 DC/DC may convert a voltage of the battery 160 to generate a preset voltage, and may regulate the generate voltage to an operation voltage of a corresponding constituent element (e.g., display unit 130, touch panel 140, and camera 150) of the mobile terminal using the LDO regulators and supplies the regulated voltage.

The CP-PMIC 230 generates power Vcp to be supplied to the CP 107 of the controller 100 and respective constituent elements of the mobile terminal controlled by the CP 107. The CP-PMIC 230 may generate operation power to the CP 107 and a communication unit 120 of a transmitter except for a power amplifier. The CP-PMIC 230 may include at least one buck converter, at least one buck-boost converter 235, and at least one LDO regulator for regulating voltages output from the buck-boost converter to a voltage suitable for constituent elements of the mobile terminal. The CP-PMIC 230 DC/DC may convert a voltage of the battery 160 to generate a preset voltage, and may regulate the generated voltage to an operation voltage of a corresponding constituent element (e.g., a modem inside the communication processor 107, or respective constituent elements inside communication unit 120) of the mobile terminal using the LDO regulators and supply the regulated voltage.

The PAM PMIC 240 generates operation power of a transmission power amplifier of the communication unit 120.

The buck converts supply voltages of the PMICs 220, 230 and 240, which are not controlled by the power controller 210, and DC/DC down converts the voltage of the battery 160 into a preset voltage and outputs the preset voltage. However, the buck-boost converters 225 and 235 convert and output a voltage while a mode may be changed according to a magnitude of an output voltage of the battery 160.

Figure 3A:
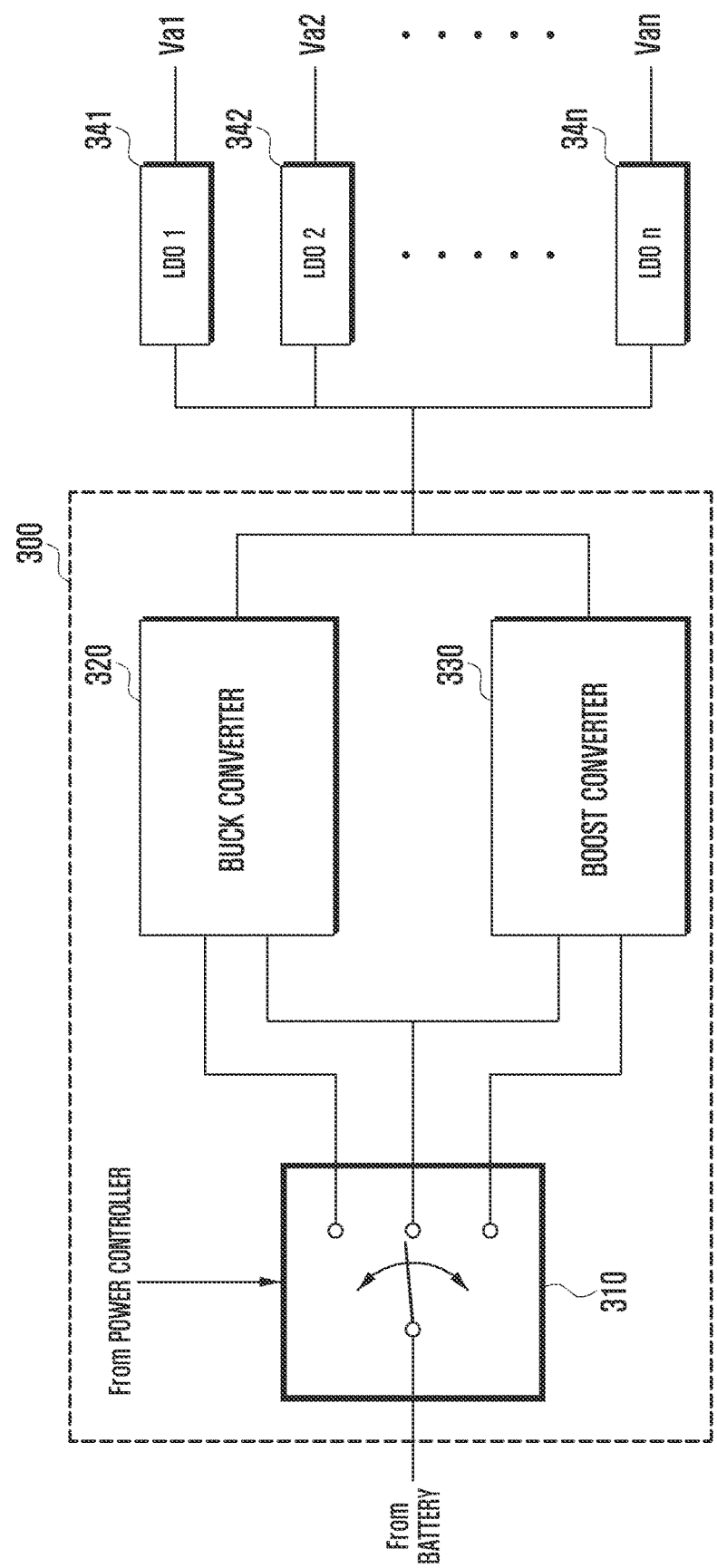
FIGS. 3A and 3B are block diagrams illustrating buck-boost converters of an Application Processor (AP) PMIC and/or a Communication Processor (CP) PMIC of FIG. 2 and a Low DropOut (LDO) regulator connected to the buck-boost converter according to an exemplary embodiment of the present invention.
Figure 3B:
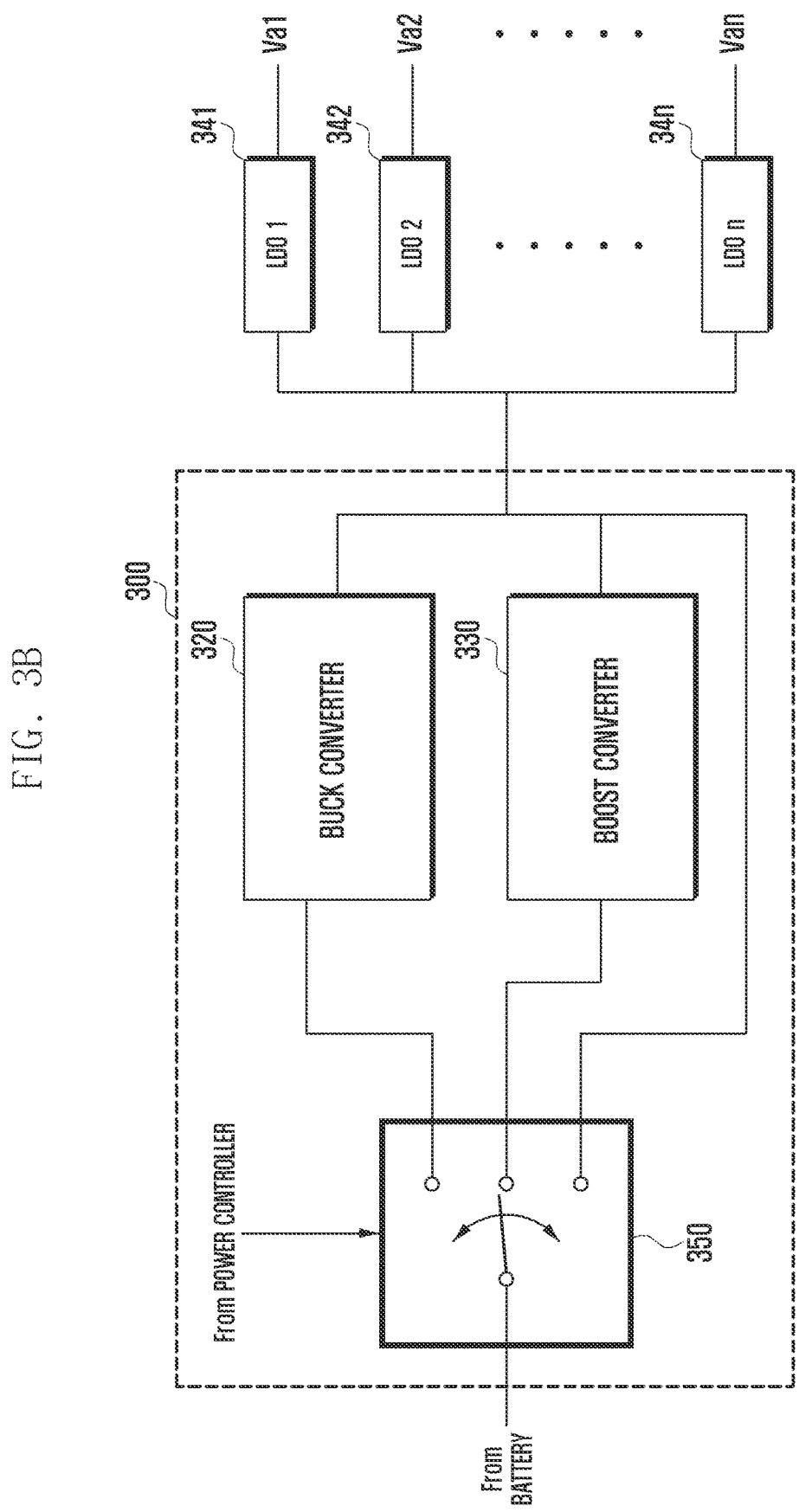

FIGS. 3A and 3B are block diagrams illustrating buck-boost converters of an AP-PMIC and/or a CP-PMIC of FIG. 2 and an LDO regulator connected to the buck-boost converter according to an exemplary embodiment of the present invention.

Referring to FIGS. 3A and 3B, the buck converter 320 is a resistive DC/DC converter, and resists an input voltage to generate a preset voltage. The boost converter 330 is a boost DC/DC converter and boosts the input voltage to generate the preset voltage. In FIG. 3A, a switch 310 is switched according to a mode control signal of the power controller 210 to apply a voltage of the battery 160 to the buck converter 320 or the boost converter 330. The switch 310, the buck converter 320, and the boost converter 330 constitute the buck-boost converter 300. The regulators 34l to 34n regulate a voltage converted and output from the buck-boost converter 300 to operation powers of corresponding constituent elements.

As shown in FIG. 2, the mobile terminal according to the present invention includes a plurality of PMICs 220 to 240. The PMICs may generate and supply operation power to the mobile terminal using the buck-boost converter 300 having a construction as illustrated in FIG. 3A or 3B. In exemplary embodiments, the buck-boost converter 300 may separately generate and transmit power having a relatively high voltage from among powers used for the mobile terminal. In exemplary embodiments, when the voltage of the battery 160 is equal to or greater than a preset voltage, the buck-boost converter 300 may operate in a buck mode to improve efficiency. When the voltage of the battery 160 is reduced to less than the preset voltage, the buck-boost converter 300 may operate in a boost mode to be continuously operated although the battery voltage is less than an operation voltage. In a discharge curve of a battery 160, when a graphite based material is used, rapid discharge occurs in a voltage less than 3.4V. When a silicon Si system material is used, a relatively slow discharge is achieved at a voltage less than 3.4V, so that a material of a battery may preferably be changed to a Si based material.

Operations of the buck-boost converter 300 and regulators 34l to 34n having a construction as illustrated above will be described. A buck-boost converter 300 is a DC/DC voltage converter, and includes a buck converter 320 and a boost converter 330. The buck-boost converter 300 performs a buck mode or a boost mode according to a voltage of the battery 160 to generate a voltage. The buck converter 320 and the boost converter 330 are a small size DC/DC voltage converter and have following characteristics.

The buck converter 320 is a resistive DC/DC converter. The buck converter 320 has a structure where input power is connected to a circuit when a switch using a switching element switching (repeating on/off) at a predetermined period is turned-on but the input power is not connected to the circuit when the switch is turned-off. In this manner, the buck converter 320 smooths (averages) a voltage of a pulse form which is periodically connected and cut through an LC filter to output a direct current voltage. A basic principle of the buck converter 320 is that it forms an output voltage by averaging a pulse voltage by periodically chopping a DC voltage. Owing to this, an output voltage of the buck converter 320 has a value less than an input voltage of the buck converter 320 (that is, an output voltage of the battery 160). If an on time of a switch is long within one period, a width of a pulse voltage is widened. If the on time of a switch is short within one period, a width of the pulse voltage becomes narrower. Accordingly, an output voltage Vo of the buck converter 320 becomes (on time of switch/switching period)*input voltage (Vi).

Second, the boost converter 330 is a boost DC/DC converter. The boost converter 330 is used when a ground of an input terminal is the same as a ground of an output terminal. When a switch is turned-on, input power (that is, the output voltage of battery 160) is connected to both terminals of an inductor so that current charge is achieved in the boost converter 330. When the switch is turned-off, a charged current is transferred to a load side. When viewed from a load side, the buck converter 320 and the boost converter 330 are periodically turned-on/off, a current is supplied, and a current of an output terminal of the boost converter 330 always becomes smaller than a current of an input terminal. Since there is no loss component in an operation of the boost converter 330, the output voltage is always higher than the input voltage according to the relation of input current*input voltage=output current*output voltage, and Vo=Vi/(1−(on time of switch/switching period)).

The buck converter 320 and the boost converter 330 generate the same output voltage. When a voltage of the battery 160 is greater than a preset voltage (i.e., the output voltage of the buck-boost converter 300; the power supplied from the buck-boost converter 300 is set to a maximum voltage or greater), the buck converter 320 operates. When the voltage of the battery 160 is less than the preset voltage, the boost converter 330 operates.

An output of the buck-boost converter 300 having a construction as illustrated above may be applied to LDO regulators 34l to 34n so the output of the buck-boost converter 300 is regulated to operation power of a corresponding constituent element and the regulated power is supplied. Maximum operation power of the LDO regulators 34l to 34n may be less than an output voltage of the buck-boost converter 300. Minimum operation power of the LDO regulators 34l to 34n may be greater than a low cutoff voltage of the mobile terminal. The LDO regulators 34l to 34n may be connected between the buck-boost converter 340 and power terminals of respective constituent elements of the mobile terminal. Each of the LDO regulators 34l to 34n may regulate an output voltage of the buck-boost converter 300 to an operation voltage of a corresponding constituent element and may supply the regulated voltage.

Hereinafter, a low cutoff voltage according to an exemplary embodiment of the present invention may be set to a voltage between 2.5V and 2.5V. A dead battery voltage of the battery 160 is set to 2.0V (that is, reduced from 2.5V to 2.0V). Further, when maximum operation power is 3.3V, the preset voltage of the buck-boost converter 300 (or the output voltage of buck-boost converter) may be set to a voltage between 3.3V and 3.5V. It is assumed that the preset voltage is 3.4V. The low cutoff voltage refers to a voltage blocking supply of operation power of the mobile terminal by discharge of the battery 160. The dead battery voltage refers to an operation voltage of a PCM (protective circuit inside battery) as over-discharge prevention voltage. The preset voltage refers to a voltage for converting a mode of the buck-boost converter 300 (that is, threshold voltage in the buck mode and the boost mode). In exemplary embodiments, an LDO regulator generating a maximum operation power may generate a voltage of 3.3V, and an LDO regulator generating a minimum operation power may generate a voltage greater than 2.5V.

The buck-boost converter 300 must convert a mode according to a charge voltage of the battery 160. The power controller 210 detects a voltage of the battery 160, and compares the voltage of the battery 160 with a preset voltage to generate a mode control signal for controlling modes of the buck-boost converters 225 and 235 of the PMICs 220 and 230. In exemplary embodiments, when a voltage of the battery 160 is greater than an output voltage of the buck-boost converter 300, the power controller 210 generates a buck mode control signal. When the voltage of the battery 160 is less than the output voltage of the buck-boost converter 300, the power controller 210 generates a boost mode control signal. If the detected voltage of the battery 160 is equal to the output voltage of the buck-boost converter 300 or a threshold voltage thereof, the power controller 210 generates a buck-boost mode control signal. The threshold voltage signifies when the voltage of the battery 160 is a voltage similar to a preset output voltage of the buck-boost converter (e.g., a voltage between 3.3V and 3.5V when the preset voltage is 3.4V). Accordingly, when the buck mode control signal is generated, the selector 310 selects an output voltage of the battery 160 and applies the selected output voltage to the buck converter 320. When the boost mode control signal is generated, the selector 310 selects the output voltage of the battery 160 and applies the selected output voltage to the boost converter 330.

However, when the voltage of the battery 160 is the same as the output voltage of the buck-boost converter 300 or becomes a similar voltage (threshold voltage) thereof, a mode control signal generated from the power controller 210 may be sensitive. That is, when the preset voltage is 3.4V, if the voltage of the battery 160 is 3.4V or a value similar to 3.4V, the power controller 210 may unstably generate a buck mode control signal or a boos mode control signal according to variation in a voltage. Accordingly, the selector 310 or 350 is unnecessary and often switched so that an output voltage of the battery 160 may be switching-output to the buck converter 320 and the boost converter 330. Accordingly, in an exemplary embodiment of the present invention, if the output voltage of the battery 160 is a preset voltage or a similar threshold voltage, the power controller 210 generates a buck-boost mode control signal.

Referring to FIG. 3A, when the buck-boost mode control signal is generated, the selector 310 having a construction as illustrated controls such that the output voltage of the battery 160 is applied to the buck converter 320 and the boost converter 330. Accordingly, when the output voltage of the battery is the same as or similar to the preset voltage (output voltage of buck-boost converter 300), both of the buck converter 320 and the boost converter 300 operate so that a voltage conversion operation may be stably performed at a threshold voltage of the buck and boost modes.

Referring to FIG. 3B, when the buck-boost mode control signal is generated, the selector 350 having a construction as illustrated controls such that the output voltage of the battery 160 is applied to respective LDO regulators 34l to 34n. That is, when the output voltage of the battery 160 is the same as or similar to the preset voltage (output voltage of buck-boos converter 300), that is, when the power controller 210 generates a buck-boost mode control signal, the selector 350 having a construction as illustrated in FIG. 3b applies the output voltage of the battery 160 to the LDO regulators 34l to 34n as it is. That is, when the output voltage of the battery 160 is a threshold voltage of the buck and boost modes, the output voltage of the battery 160 may be substantially the same as the output voltage of the buck-boost converter 300. Accordingly, the LDO regulators 34l to 34n may regulate the voltage to generate a corresponding operation voltage.

Figure 4:
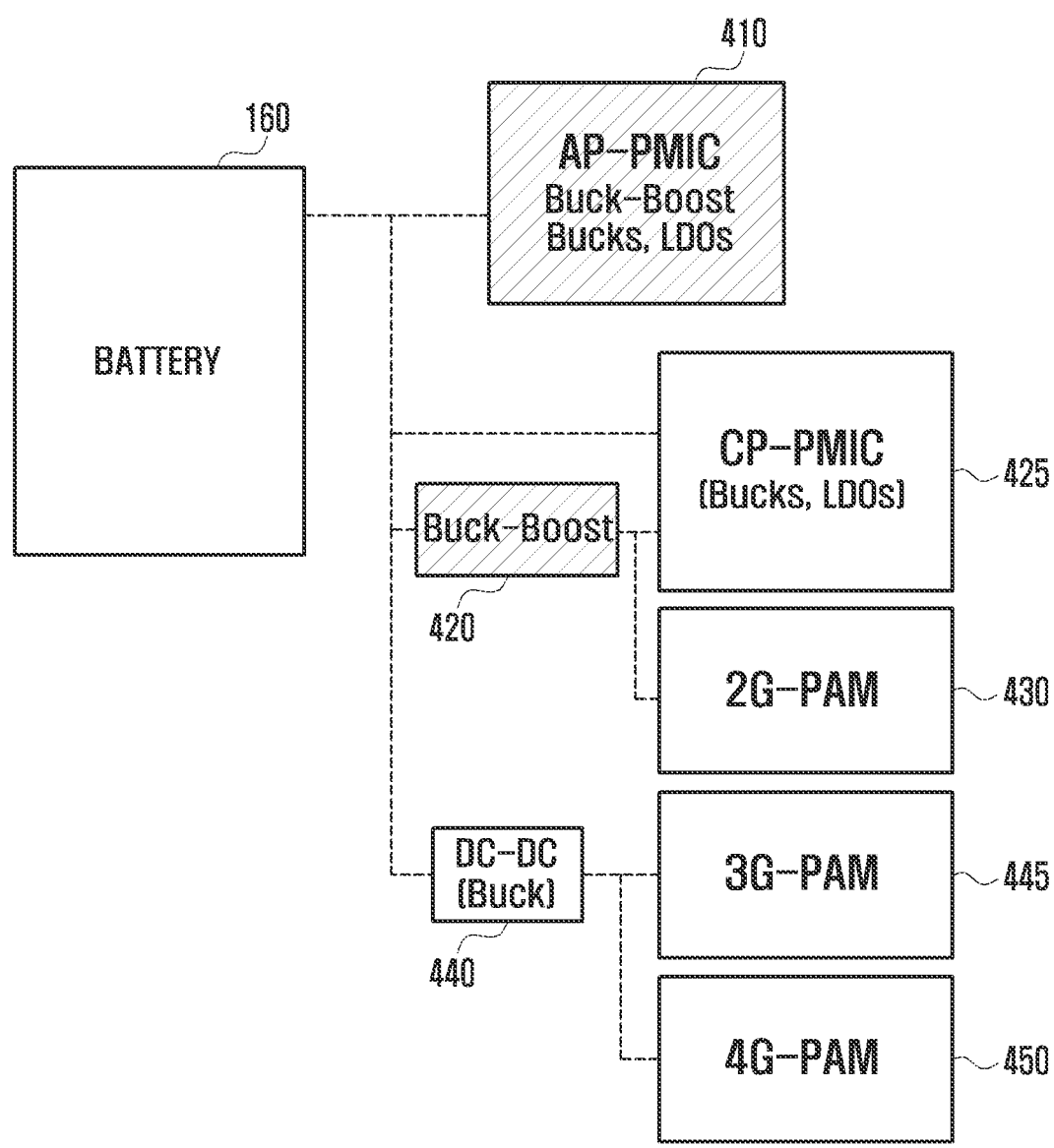
FIG. 4 is a block diagram illustrating low cutoff power of an apparatus for supplying power in a portable terminal according to an exemplary embodiment of the present invention.

FIG. 4 is a block diagram illustrating low cutoff power of an apparatus for supplying power in a portable terminal according to an exemplary embodiment of the present invention.

Referring to FIG. 4, as illustrated above, when the voltage of the battery 160 is less than a preset voltage (output voltage of buck-boost converter, operation voltage of mobile terminal), the mobile terminal according to an exemplary embodiment of the present invention operates in a boost mode. Accordingly, although the voltage of the battery 160 may be less than an operation voltage, the apparatus for supplying power according to an exemplary embodiment of the present invention may continuously supply operation power of the system.

In a discharge curve of a battery, when a graphite based material is used, rapid discharge occurs in a voltage less than 3.4V. When a silicon SI system material is used, a relatively slow discharge is achieved at a voltage less than 3.4V, so that a material of a battery is preferably changed to a Si system material.

As illustrated above, since the apparatus for supplying power in a mobile terminal according to an exemplary embodiment of the present invention may operate at a low battery voltage, it is preferable to reduce a low cutoff voltage and a dead battery voltage. It is assumed in an exemplary embodiment of the present invention that the low cutoff voltage is set to a voltage between 2.7V and 3V, and a dead battery voltage varies from current 2.5V to 2.0V. The dead battery voltage refers to an operation voltage of a PCM (internal protective circuit of battery) as over-discharge prevention voltage.

The apparatus for supplying power in a mobile terminal according to an exemplary embodiment of the present invention may include a plurality of power supply units (e.g., PMICs) according to a configuration of the mobile terminal. Particularly, when the mobile terminal is a terminal device such as a smart phone, as illustrated above, the controller 100 may include an AP 105 and a CP 107. The AP 105 processes various applications of the terminal device. An AP-PMIC 410 may supply operation powers of a display unit 130, a touch panel 140, and a camera 150 operating under control of the AP 105. The CP-PMIC 425 supplies operation powers of a communication unit 120 and a modem of the CP 107 which are constituent elements associated with communication. To this end, in an exemplary embodiment of the present invention, a buck-boost converter may be mounted in the AP-PMIC 410 so a low cutoff (e.g., low cutoff voltage may be set to 3V) is possible, and 2G RF and a buck-boost converter 420 may be additionally provided to a front state of the CP-PMIC 425. Operation power of the transmission power amplifier 430, 445 or 450 located at a transmitter inside a 3G or 4G communication unit 120 may be supplied by a buck converter 440.

Figure 5:
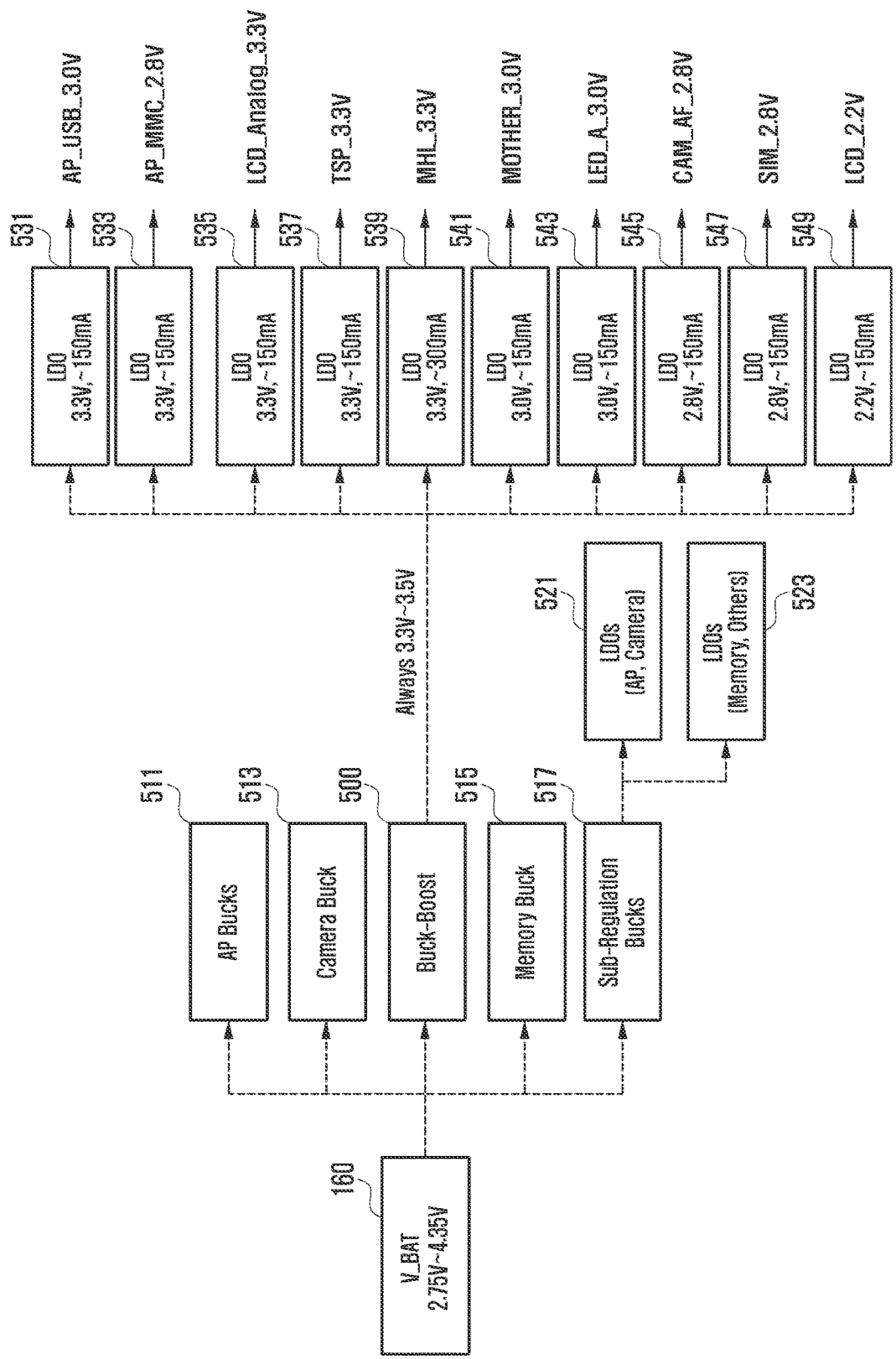
FIG. 5 is a block diagram illustrating a configuration of an AP-PMIC shown in FIG. 4 according to an exemplary embodiment of the present invention.

FIG. 5 is a block diagram illustrating a configuration of an AP-PMIC 410 shown in FIG. 4 according to an exemplary embodiment of the present invention.

Referring to FIG. 5, an AP-PMIC (220 of FIG. 2 or an AP-PMIC 410 of FIG. 4) includes four buck converters 511 to 517 and one buck-boost converter 500. The buck converters 511 to 517 may generate an operation voltage greater or less than a voltage output from the buck-boost converter 500 and may supply the generated operation voltage as operation power of a corresponding constituent element. For example, the AP buck converter 511 may operate under control of the AP 105, and may variably generate operation power according to a load of a system and supplies the generated operation power as operation power of the AP 105. Further, the camera buck converter 513 may generate a voltage greater than a voltage generated from the buck-boost converter 500 such as a flash of the camera 150. The sub-regulation buck converter 517 may generate power for LDO regulators 521 and 523 which may regulate the voltage generated from the sub-regulation buck converter to an operation voltage having a magnitude corresponding to a constituent element to supply a voltage necessary for a system.

The buck-boost converter 500 always generates a constant voltage (it is assumed in an exemplary embodiment of the present invention that the constant voltage may be a value from 3.3V to 3.5V). That is, the buck-boost converter 500 according to an exemplary embodiment of the present invention is a DC/DC converter which separately collects and supplies powers of a relatively high voltage from among powers used for the mobile terminal, and may be mounted inside the AP-PMIC as a configuration as illustrated in FIG. 3a or 3b. When the voltage of the battery 160 is equal to or greater than a specific voltage, the buck-boost converter 500 serves as a buck converter under control of a power controller 210. When the voltage of the battery 160 is less than the specific voltage, the buck-boost converter 500 serves as a boost converter. Accordingly, even if the voltage of the battery 160 is less than an operation voltage, the buck-boost converter 500 may continuously supply the operation power. In exemplary embodiments, when the voltage of the battery 160 is greater than an output voltage of the buck-boost converter 500, the buck-boost converter 500 operates in a buck mode. LDO regulators 531 to 549 regulate a voltage generated from a buck converter inside the buck-boost converter to an operation voltage having magnitude corresponding to a constituent element to supply a voltage necessary for a system. The LDO regulators 531 to 549 may be turned-on/off. Upon executing an application where a corresponding constituent element is not operated, the LDO regulators 531 to 549 are turned-off. Further, when the voltage of the battery 160 is less than the output voltage of the buck-boost converter 550, the buck-boost converter 500 operates in a boost mode. Even when the buck-boost converter 500 operates in a boost mode, a voltage generated from an internal boost converter have the same voltage from 3.3V to 3.5V as that generated from a buck converter. Accordingly, the LDO regulators 531 to 549 may generate operation powers of corresponding constituent elements in the same manner as in the buck mode.

Figure 6:
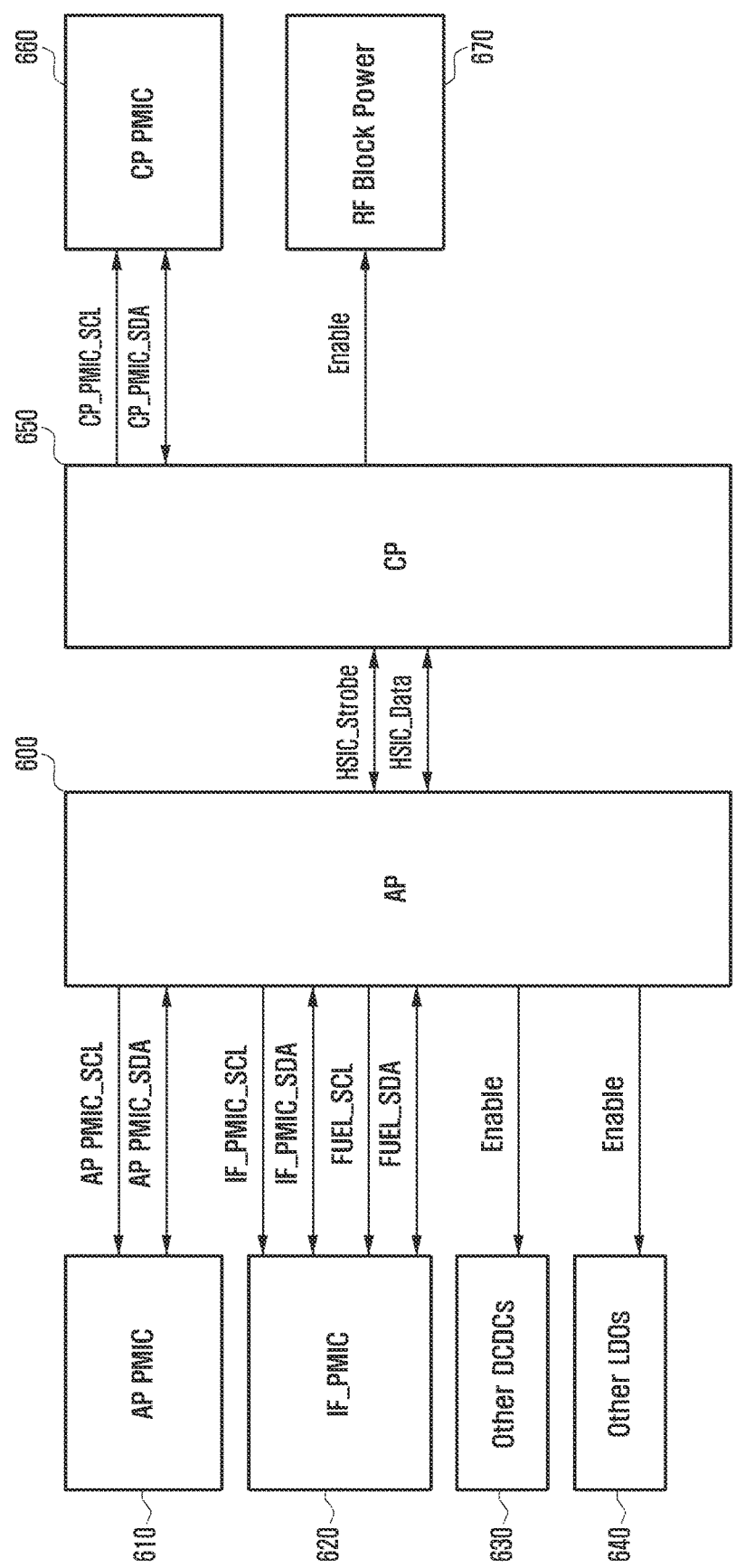
FIG. 6 is a block diagram illustrating a configuration for controlling an apparatus for supplying power according to an exemplary embodiment of the present invention according to an exemplary embodiment of the present invention.

FIG. 6 is a block diagram illustrating a configuration for controlling an apparatus for supplying power according to an exemplary embodiment of the present invention having a construction as illustrated in FIGS. 4 and 5.

Referring to FIG. 6, an AP-PMIC 610, an IF_PMIC 620, other DCDCs 630, and other LDOs 640 operate under control of an AP 600, and a CP-PMIC 660 and an FR block power 670 operate under control of a CP 650. The apparatus for supplying power as illustrated above may normally supply operation power of a system although a charge voltage of the battery 160 is reduced according to an operation of the mobile terminal. Further, a corresponding AP 600 or CP 650 may control power of the apparatus for supplying power using I2C or GPIO Interface. Accordingly, the AP 600 and the CP 650 reads a register to determine whether buck-boost converts of the AP-PMIC 610 and the CP-PMIC 660 currently operate in a buck mode or a boost mode. In exemplary embodiments, the AP 600 reads a corresponding register of the AP-PMIC 610. If the buck-boost converter operates in a buck mode, the AP 600 may detect that a battery has sufficient capacity. If the buck-boost converter operates in a buck boost mode, the AP 600 may detect that the capacity of the battery 160 is almost consumed. In exemplary embodiments, if the buck-boost converter operates in a buck mode, the AP 600 may output a color of an item (or icon) for displaying capacity of a battery as a green color through the display unit 130. If the buck-boost converter operates in a boost mode, the AP 600 may output a color of an item (or icon) for displaying capacity of a battery as a red color through the display unit 130 to report that the capacity of the battery remains small.

Figure 7:
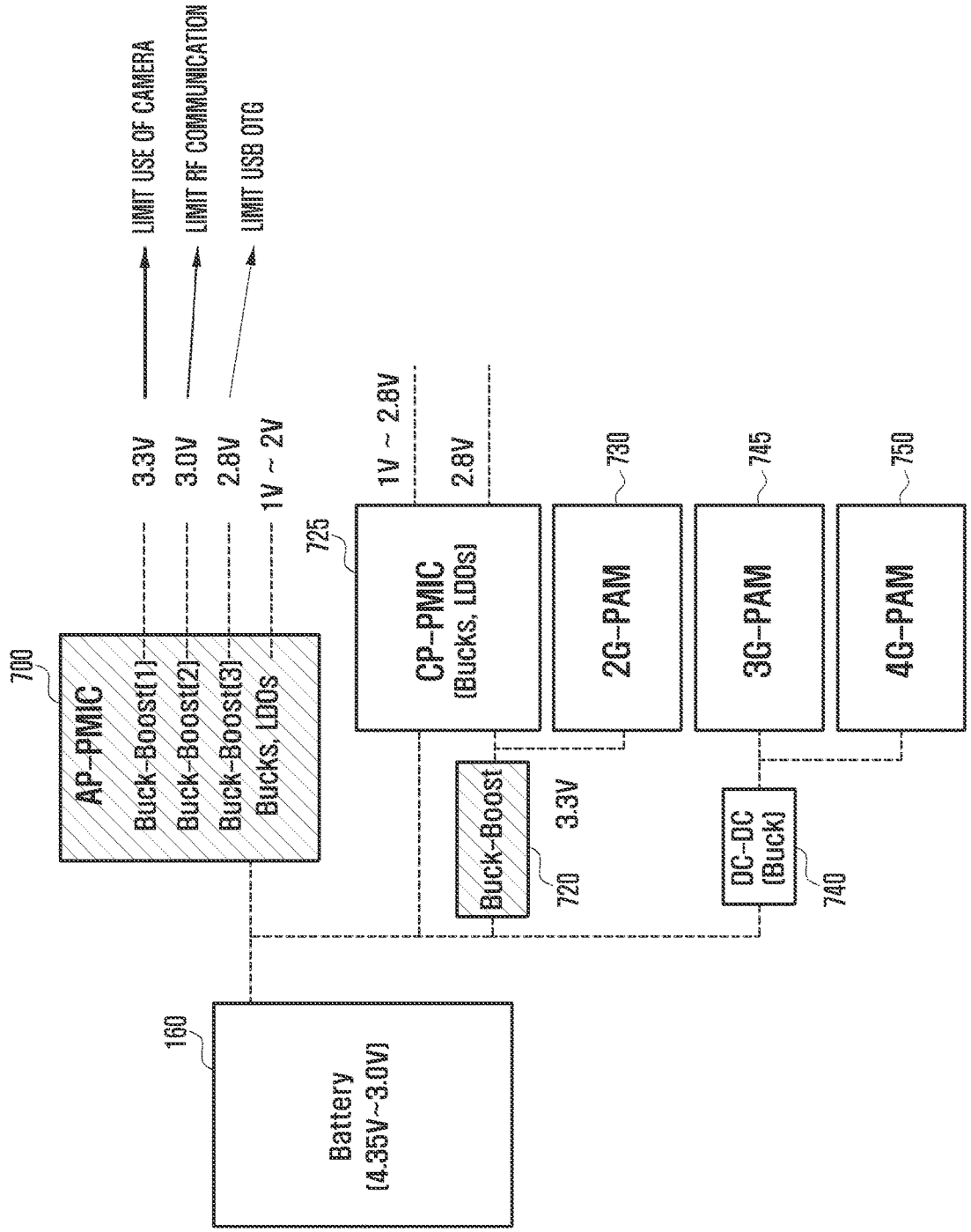
FIG. 7 is a block diagram illustrating a configuration of a mobile terminal according to an exemplary embodiment of the present invention.

FIG. 7 is a block diagram illustrating a configuration of a mobile terminal according to an exemplary embodiment of the present invention.

Referring to FIG. 7, a remaining configuration except for a configuration of the AP-PMIC 700 are the same as that of FIG. 4. That is, configurations and operations of reference numerals 720 to 750 of FIG. 7 are the same as those of reference numerals 420 to 450 of FIG. 4. The AP-PMIC 700 according to an exemplary embodiment of the present invention may include a plurality of buck-boost converters therein.

Figure 8:
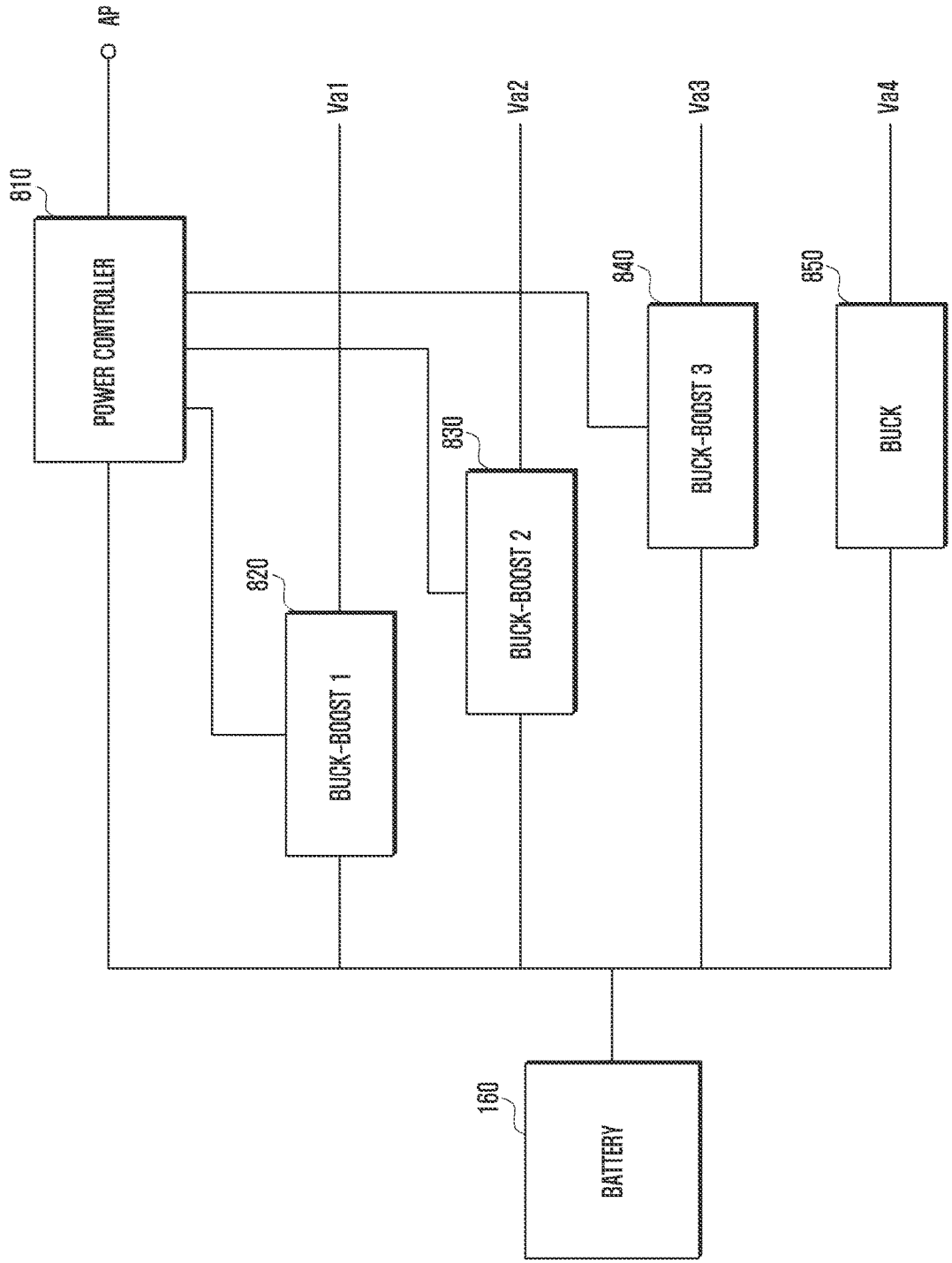
FIG. 8 is a block diagram illustrating a configuration of an AP-PMIC shown in FIG. 7 according to an exemplary embodiment of the present invention.

FIG. 8 is a block diagram illustrating a configuration of an AP-PMIC shown in FIG. 7 according to an exemplary embodiment of the present invention.

Referring to FIG. 8, an AP-PMIC 700 (not shown) includes a buck converter 850, and a plurality of (e.g., three) buck-boost converters, and the respective buck-boost converters may separately maximize efficiency by determining voltages. The power controller 810 generates mode control signals for controlling operation modes of respective buck-boost converters 820 to 840, and configurations of the buck-boost converters 820 to 840 may have configurations as illustrated in FIG. 3a or 3b. Hereinafter, it is assumed that an output voltage of the first buck-boost converter 820 is set to 3.3V, an output voltage of the second buck-boost converter 830 is set to 3.0V, and an output voltage of a third buck-boost converter 840 is set to 2.8V.

The power controller 810 detects an output of the battery 160. If a battery voltage is equal to or greater than 3.3V, the power controller 810 controls the first to third buck-boost converts 820 to 840 to be in a buck mode. When the battery voltage is between 3.0V and 3.3V, the first buck-boost converter 820 is controlled in a boost mode, and the second and third buck-boost converters 830 and 840 are controlled in a buck mode. When the battery voltage is between 2.8V and 3.0V, the first and second buck-boost converter 820 and 830 are controlled in the boost mode, and the third buck-boost converter 840 is controlled in the buck mode. When the battery voltage is less than 2.8V, the first to third buck-boost converter 820 to 840 are controlled in the boost mode.

Further, the power controller 201 reports a charge voltage state of the battery 160 to the AP 105. That is, the AP 105 may read an output of the power controller 810 to detect a charge state of the battery 160. Accordingly, when a buck-boost converter 820 having an output voltage of 3.3V operates in the boost mode under control of the power controller 810, the AP 105 may limit a function of a camera 150. If the buck-boost converter 830 having an output voltage of 3.0V starts a boost mode operation, the AP 105 may limit a call function. If the buck-boost converter 840 having an output voltage of 2.8V starts a boost mode operation, the AP 105 may limit a USB OTG function. As described above, when the specific function of the mobile terminal is limited, since voltage variation at an output terminal of each buck-boost converter is not necessary, a LDO regulator or a DC/DC converter is not necessary, and power may be separated using a load switch.

Figure 9:
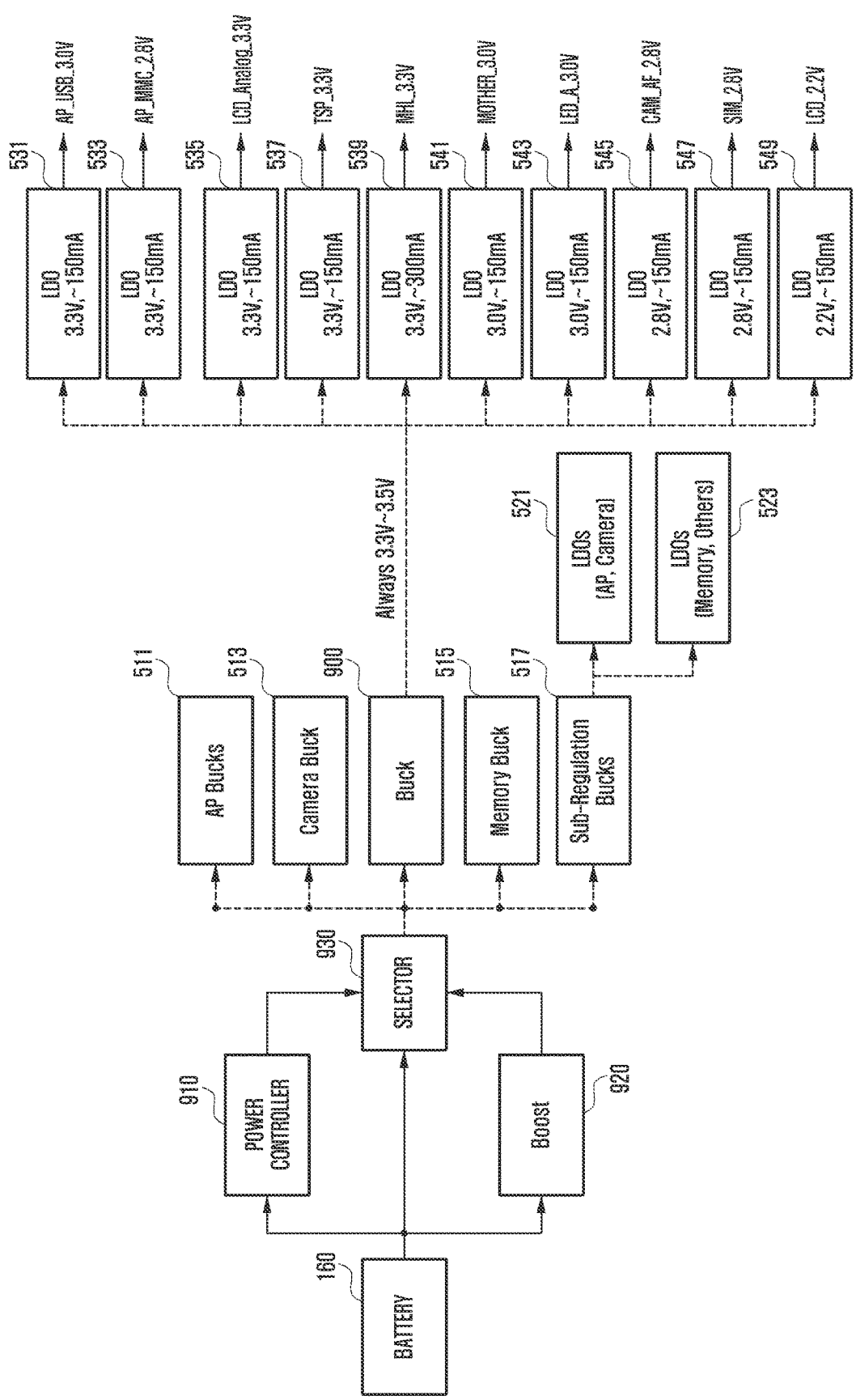
FIG. 9 is a block diagram illustrating a configuration of a mobile terminal according to an exemplary embodiment of the present invention.

FIG. 9 is a block diagram illustrating a configuration of a mobile terminal according to an exemplary embodiment of the present invention.

Referring to FIG. 9, a power controller 901 detects an output voltage of the battery 160, determines whether the detected voltage of the battery 160 is equal to or greater than a preset voltage, and generates a conversion control signal according to the determination result. The preset voltage is a voltage higher than a maximum operation voltage among operation voltages supplied to the mobile terminal. The power controller 910 may include a voltage comparator. A boost converter 920 is a boost DC/DC converter. A selector 930 receives output voltages of the battery 160 and the boost converter 920, and selects and output a voltage corresponding to a conversion control signal of the power controller 901. Buck converters 511 to 517, and 900 are a resistive DC/DC converter, and convert a voltage output from the selector 930. The sub-regulation buck converter 517 may generate power for LDO regulators 521 and 523 which may regulate the voltage generated from the sub-regulation buck converter to an operation voltage having a magnitude corresponding to a constituent element to supply a voltage necessary for a system. A plurality of regulators 531 to 549 are connected to an output terminal of the buck converter 900. The regulators 531 to 549 regulate an output voltage of the buck-boost converter 500 to operation powers of respective constituent elements of the mobile terminal. The buck converter 900 according to an exemplary embodiment of the present invention is a DC/DC converter which separately collects and supplies powers of a relatively high voltage from among powers used for the mobile terminal, and may be mounted inside the AP-PMIC as a configuration as illustrated in FIG. 3A or 3B.

In exemplary embodiments, an output of the buck converter 900 may be greater than a maximum operation voltage of operations voltages of constituent elements of the mobile terminal. In a case of FIG. 9, the maximum voltage may be 3.3V. In exemplary embodiments, the output voltage of the buck converter 900 may be equal to or greater than 3.3V. It may be assumed that the output voltage of the buck converter 900 is 3.4V. In exemplary embodiments, a reference voltage in the power controller 910 must be greater than the output voltage of the buck converter 900. As described, 3.4V may be used as the reference voltage.

When the output voltage of the battery 160 is equal to or greater than a preset reference value, the power controller 100 controls the selector 930 to apply the output voltage of the battery 160 to the buck converters 511 to 517, and 900. Accordingly, when the voltage of the battery 160 is greater than the output voltage of the buck converter 900, the buck converter 900 converts the output voltage of the battery 160 to a preset voltage (e.g., 3.4V) and outputs the converted voltage, and the LDO regulators 531 to 549 regulates the voltage to an operation voltage of magnitude corresponding to a constituent element to supply a voltage necessary for a system. The LDO regulators 531 to 549 may be turned-on/off. Upon executing an application where a corresponding constituent element is not operated, the LDO regulators 530 to 549 are turned-off.

In exemplary embodiments, when the output voltage of the battery 160 is less than the preset reference voltage, the power controller 100 may control the selector 930 to apply the output voltage of the boost converter 920 to the buck converters 511 to 517, and 900. In exemplary embodiments, the boost converter 920 receives a voltage of the battery 160 less than the output voltage of the buck converter 900, and boosts the voltage of the battery 160 to magnitude of the output voltage of the buck converter 900 to output the boosted voltage. Accordingly, even when the output voltage of the battery 160 is less than the maximum operation voltage of the mobile terminal, the LDO regulators 531 to 549 may generate operation powers of corresponding constituent elements. In exemplary embodiments, as described above, the cutoff voltage is set to a value greater than the dead battery voltage and less than the maximum operation voltage. Further, as described above, when the voltage of the battery 160 is the same as or similar to the output voltage of the buck converter 900 (that is, reference voltage of the power controller 910), the power controller 901 selects and outputs both of the output of the battery 160 and the output of the boost converter 902, or selects and outputs only the output of the battery 160. For example, when the reference voltage is 3.4V and the voltage of the battery 160 is in a range of 3.3V to 3.5V, the power controller 910 may control the selector 930 to apply output voltages of the battery 160 and the boost converter 920 to the buck converters 511 to 517, and 900 or to supply only the output of the battery 160 to the buck converters.

A buck-boost converter is mounted inside the apparatus for supplying power in the mobile terminal according to an exemplary embodiment of the present invention. When the battery voltage is equal to or greater than a specific voltage, the mobile terminal operated in the buck mode. When the battery voltage is less than the specific voltage, the mobile terminal operated in a boost mode to be continually operated although when the battery voltage is lower than an operation voltage. Accordingly, a use time of the battery can be increased by reducing a cutoff voltage of the mobile terminal using the battery. For example, when cutoff of 3.0V is applied, the use time of the battery can be increased to maximum 38 minutes. When cutoff of 2.75V is applied, the use time of the battery can be increased to maximum 47 minutes. The buck-boost converter may be mounted in the AP-PMIC in the mobile terminal so that a mounting space can be reduced. Power consumption is minimized by performing voltage setting and on/off through addition of LDO regulators to the buck-boost converter by powers. The mobile terminal according to an exemplary embodiment of the present invention can recognize an operation mode of the buck-boost converter to display a residual amount of the battery.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for supplying power in a mobile terminal, the apparatus comprising:
 a battery;
 a controller having a communication processor and an application processor;
 a power management integration circuit of the application processor including a buck-boost converter for converting a battery voltage to output a specific voltage; and
 a plurality of regulators configured to:
  regulate the specific voltage output from the buck-boost converter to voltages of respective corresponding constituent elements, and
  output the regulated voltages, the buck-boost converter operating in a buck mode when the battery voltage is greater than the specific voltage, and the buck-boost converter operating in a boost mode when the battery voltage is less than the specific voltage,
 wherein the constituent elements include:
  the controller configured to control an operation of the mobile terminal;
  a touch panel configured to:
   generate an input, and
   provide the generated input signal to the controller; and
  a display configured to display an operation of the mobile terminal under the control of the controller, and to which a voltage from the power management integration circuit is supplied.

2. The apparatus of claim 1, wherein the specific voltage is greater than a maximum operation voltage used from the constituent elements.

3. The apparatus of claim 2, wherein the controller is further configured to:
 confirm the mode of the buck-boost converter, and
 display the boost mode on the display when the mode of the buck-boost converter is the boost mode.

4. The apparatus of claim 3, wherein the buck-boost converter comprises:
 a buck converter including a resistive DC/DC voltage converter;
 a boost converter including a boost DC/DC voltage converter; and
 a selector configured to:
  select the buck converter when the battery voltage is greater than an output voltage of the buck-boost converter to apply the battery voltage to the selected buck converter,
  select the boost converter when the battery voltage is less than the output voltage of the buck-boost converter to apply the battery voltage to the selected boost converter, and
  select both of the buck converter and the boost converter when the battery voltage is at a threshold voltage of the output voltage of the buck-boost converter to apply the battery voltage to the selected buck and boost converters.

5. The apparatus of claim 3, wherein the buck-boost converter comprises:
 a buck converter including a resistive DC/DC voltage converter;
 a boost converter including a boost DC/DC voltage converter; and
 a selector configured to:
  select the buck converter when the battery voltage is greater than an output voltage of the buck-boost converter and apply the battery voltage to the selected buck converter,
  select the boost converter when the battery voltage is less than the output voltage of the buck-boost converter and apply the battery voltage to the selected boost converter, and directly apply the battery voltage to the regulators when the battery voltage is at a threshold voltage of the output voltage of the buck-boost converter.

6. The apparatus of claim 4, wherein the battery comprises a silicon based battery.

7. The apparatus of claim 6,
wherein the specific voltage is set to a voltage between 3.3V and 3.5V, and
wherein the regulators generate voltages between 2.2V and 3.3V.

8. An apparatus for supplying power in a mobile terminal, the apparatus comprising:
a battery;
a controller having a communication processor and an application processor;
a power management integration circuit of the application processor including a plurality of buck-boost converters configured to:
convert a battery voltage into specific voltages having different values, and
output the converted specific voltages to respective corresponding constituent elements, the buck-boost converters operating in a buck mode when the battery voltage is greater than the specific voltages, and the buck-boost converters operating in a boost mode when the battery voltage is less than the specific voltages;
the controller configured to control an operation of the mobile terminal;
a touch panel configured to:
generate an input, and
provide the generated input signal to the controller; and
a display configured to display an operation of the mobile terminal under the control of the controller, and to which a voltage from the power management integration circuit is supplied.

9. The apparatus of claim 8, wherein the controller is further configured to:
confirm modes of the buck-boost converters, and
limit a corresponding function of the mobile terminal according to an output voltage of the buck-boost converter operating in the boost mode.

10. The apparatus of claim 9, wherein the buck-boost converter comprises:
a buck converter including a resistive DC/DC voltage converter;
a boost converter including a boost DC/DC voltage converter; and
a selector configured to:
select the buck converter when the battery voltage is greater than an output voltage of the buck-boost converter and g the battery voltage to the selected buck converter,
select the boost converter when the battery voltage is less than the output voltage of the buck-boost converter and apply the battery voltage to the selected boost converter, and
select both of the buck converter and the boost converter when the battery voltage is at a threshold voltage of the output voltage of the buck-boost converter and apply the battery voltage to the selected buck and boost converters.

11. The apparatus of claim 9, wherein the buck-boost converter comprises:
a buck converter including a resistive DC/DC voltage converter;
a boost converter including a boost DC/DC voltage converter; and
a selector configured to:
select the buck converter when the battery voltage is greater than an output voltage of the buck-boost converter and apply the battery voltage to the selected buck converter,
select the boost converter when the battery voltage is less than the output voltage of the buck-boost converter and apply the battery voltage to the selected boost converter, and
directly apply the battery voltage to the regulators when the battery voltage is at a threshold voltage of the output voltage of the buck-boost converter.

12. The apparatus of claim 10, wherein the battery comprises a silicon based battery.

13. An apparatus for supplying power in a mobile terminal, the apparatus comprising:
a controller having a communication processor and an application processor;
a touch panel configured to generate and provide an input signal to the controller;
a display configured to display an operation of the mobile terminal under control of the controller;
a battery; and
a power management integration circuit including:
a power management integration circuit of the communication processor; and
a power management integration circuit of the application processor configured to supply a voltage to the constituent elements, the power management integration circuit of the application processor including:
a buck-boost converter configured to:
convert a battery voltage, and
output a specific voltage, and
a plurality of regulators configured to:
regulate the specific voltage output from the buck-boost converter to voltages of respective corresponding constituent elements, and
output the regulated voltages,
wherein the buck-boost converter is configured to operate in a buck mode when the battery voltage is greater than the specific voltage, and
wherein the buck-boost converter is configured to operate in a boost mode when the battery voltage is less than the specific voltage.

14. The apparatus of claim 13, wherein the power management integration circuit comprises:
a power controller configured to:
detect a battery voltage,
output a buck mode control signal when the battery voltage is greater than a preset voltage, and
output a boost mode control signal when the battery voltage is less than the preset voltage;
an application processor power management integration circuit including:
a buck-boost converter, and
a plurality of regulators connected to the buck-boost converter, the buck-boost converter configured to operate in a buck mode or a boost mode to output the battery voltage as a specific voltage according to a mode control signal from the power controller, and the plurality of regulators configured to:
regulate specific voltages of the buck-boost converter to voltages of the respective corresponding constituent elements, and output the regulated voltages to constituent elements operated under control of the application processor; and a communication processor power management integration circuit configured to:
convert the battery voltage into a preset voltage, and
output the converted voltage to constituent elements operated under control of the communication processor.

15. The apparatus of claim 14, wherein the power controller is further configured to confirm a mode of the buck-boost converter and generate an alarm when a low voltage of the battery is in the boost mode.

16. The apparatus of claim 15, wherein the battery comprises a silicon based battery.

17. The apparatus of claim 16, wherein the buck-boost converter of the application processor power management integration circuit comprises:
a buck converter including a resistive DC/DC voltage converter;
a boost converter including a boost DC/DC voltage converter; and
a selector configured to:
apply the battery voltage to a buck converter when the power controller outputs the buck mode control signal,
output the battery voltage to a boost converter when the power controller outputs the boost mode control signal, and
directly apply the battery voltage to the regulators when the power controller generates a buck-boost mode control signal.

18. The apparatus of claim 16, wherein a buck-boost converter of the application processor power management integration circuit comprises:
a buck converter including a resistive DC/DC voltage converter;
a boost converter including a boost DC/DC voltage converter; and
a selector configured to:
apply the battery voltage to a buck converter when the power controller outputs the buck mode control signal,
output the battery voltage to a boost converter when the power controller outputs the boost mode control signal, and
apply the battery voltage to the buck converter and the boost converter when the power controller generates a buck-boost mode control signal.

19. A method of supplying power in a portable terminal including a battery, the method comprising:
inspecting a battery voltage;
operating the mobile terminal in a buck mode when the battery voltage is greater than an output voltage of a buck-boost converter to output a preset voltage;
operating the mobile terminal in a boost mode to output a preset voltage when the battery voltage is less than the output voltage of a buck-boost converter;
operating the mobile terminal in a buck-boost mode when the battery voltage is at a threshold voltage of the output voltage of the buck-boost converter; and
regulating the output preset voltage to an operation voltage of a corresponding constituent element to supply operation power.

20. The method of claim 19, wherein the operating of the mobile terminal comprises:
applying the battery voltage to a buck converter when a buck mode control signal is output so that the battery voltage is converted;
applying the battery voltage to a boost converter when a boost mode control signal is output so that the battery voltage is converted; and
applying the battery voltage to the buck converter and the boost converter when a buck-boost mode control signal is output so that the battery voltage is converted.

* * * * *